(12) United States Patent
Bourcier et al.

(10) Patent No.: US 11,079,582 B2
(45) Date of Patent: Aug. 3, 2021

(54) BROADBAND HYPERSPECTRAL SPECTROPHOTOMETER

(71) Applicants: Centre National d'Études Spatiales, Paris (FR); CENTRE NATIONAL DE LA RECHERCHE SCIENTIFIQUE, Paris (FR); SORBONNE UNIVERSITE, Paris (FR)

(72) Inventors: Frédéric Bourcier, Pompertuzat (FR); Philippe Walter, Saint Cloud (FR)

(73) Assignees: Centre National d'Etudes Spatiales, Paris (FR); CENTRE NATIONAL DE LA RECHERCHE SCIENTIFIQUE, Paris (FR); SORBONNE UNIVERSITY, Paris (FR)

( * ) Notice: Subject to any disclaimer, the term of this patent is extended or adjusted under 35 U.S.C. 154(b) by 395 days.

(21) Appl. No.: 16/028,695

(22) Filed: Jul. 6, 2018

(65) Prior Publication Data

US 2019/0018230 A1 Jan. 17, 2019

(30) Foreign Application Priority Data

Jul. 6, 2017 (FR) ...................................... 17/56384

(51) Int. Cl.
*G02B 21/00* (2006.01)
*G02B 21/24* (2006.01)
(Continued)

(52) U.S. Cl.
CPC .......... *G02B 21/0048* (2013.01); *G01J 3/021* (2013.01); *G01J 3/0208* (2013.01);
(Continued)

(58) Field of Classification Search
CPC ............ G02B 21/0048; G02B 21/0076; G02B 21/245; G01J 3/021; G01J 3/0243;
(Continued)

(56) References Cited

U.S. PATENT DOCUMENTS

| 4,215,273 A | 7/1980 | Stokes et al. |
| 5,459,325 A | 10/1995 | Hueton et al. |

(Continued)

FOREIGN PATENT DOCUMENTS

WO 2015071181 5/2015

*Primary Examiner* — William R Alexander
*Assistant Examiner* — Rahman Abdur
(74) *Attorney, Agent, or Firm* — Burris Law, PLLC

(57) ABSTRACT

The present disclosure concerns a broadband hyperspectral imaging spectrophotometer configured to analyze an object and includes an illumination assembly having a source for emitting a light beam and configured so that the light beam scans line by line the object to be analyzed, a focusing mirror, a first mirror folding, and a planar scanning mirror movable in rotation. The illumination assembly, the focusing mirror, the first folding mirror and the planar mirror are arranged to bring the light beam to the object along a line which will be displaced on the object via the scanning mirror. The imaging spectrophotometer further includes two measuring sensors by a distance between the object and the scanning mirror. The focusing mirror is movable in translation to adapt the imager to the measured distance by the measuring sensors.

10 Claims, 5 Drawing Sheets

(51) Int. Cl.
*G01J 3/28* (2006.01)
*G01N 21/64* (2006.01)
*G01J 3/02* (2006.01)
*G01J 3/14* (2006.01)

(52) U.S. Cl.
CPC .......... *G01J 3/0243* (2013.01); *G01J 3/0254* (2013.01); *G01J 3/0289* (2013.01); *G01J 3/14* (2013.01); *G01J 3/2823* (2013.01); *G01N 21/64* (2013.01); *G02B 21/0076* (2013.01); *G02B 21/245* (2013.01); *G01N 2021/6417* (2013.01)

(58) Field of Classification Search
CPC .......... G01J 3/14; G01J 3/0208; G01J 3/0289; G01J 3/0254; G01J 3/2823; G01N 21/64; G01N 2021/6417
USPC .......................................................... 359/368
See application file for complete search history.

(56) References Cited

U.S. PATENT DOCUMENTS

| | | | | |
|---|---|---|---|---|
| 6,909,540 | B2* | 6/2005 | Engelhardt | G02B 21/02 359/368 |
| 7,335,898 | B2* | 2/2008 | Donders | G02B 21/0036 250/458.1 |
| 9,435,747 | B2* | 9/2016 | Song | G01N 21/55 |
| 2002/0163715 | A1* | 11/2002 | Engelhardt | G02B 21/0048 359/368 |
| 2005/0275847 | A1* | 12/2005 | Moshe | G01J 3/021 356/456 |
| 2005/0280906 | A1* | 12/2005 | Scheiner | G02B 19/0023 359/726 |
| 2008/0106786 | A1* | 5/2008 | Nagasawa | A61B 5/0064 359/379 |
| 2014/0078509 | A1* | 3/2014 | Moshe | G01J 3/0202 356/452 |

* cited by examiner

BROADBAND HYPERSPECTRAL SPECTROPHOTOMETER

CROSS-REFERENCE TO RELATED APPLICATIONS

This application claims priority to and the benefit of FR 17/56384 filed on Jul. 6, 2017. The disclosures of the above application is incorporated herein by reference.

FIELD

The present disclosure concerns the field of the hyperspectral imaging or spectro-imaging which consists in acquiring an image in a large number of narrow spectral bands.

BACKGROUND

The statements in this section merely provide background information related to the present disclosure and may not constitute prior art.

To acquire hyperspectral images, catadioptric instruments are known (see the documents U.S. Pat. Nos. 5,459,325 and 4,215,273). However, these instruments have the disadvantage of having lenses that induce a chromaticism which in fact does not allow having all wavelengths.

In addition, these instruments are bulky which turns out to be a disadvantage when the object to be imaged is not simply accessible.

SUMMARY

The present disclosure proposes to overcome the aforementioned disadvantages.

For this purpose, the present disclosure proposes a broadband hyperspectral imaging spectrophotometer configured to analyze an object, said spectrophotometer includes an illumination assembly having a source of emission of a light beam. The assembly is configured so that the light beam scans line by line the object to be analyzed. The spectrophotometer further includes a focusing mirror, a first folding mirror, and a planar scanning mirror movable in rotation. The illumination assembly, the focusing mirror, the first folding mirror and the planar mirror are arranged to bring the light beam to the object along a line which will be displaced on the object via the scanning mirror. The imaging spectrophotometer further includes two sensors for measuring a distance between the object and the scanning mirror, and in that the focusing mirror is movable in translation to adapt the imager to the distance measured by said measuring sensors.

The present disclosure may further include the following, taken alone or in any of their technically possible combination.

The first folding mirror includes a front face oriented towards the focusing mirror and a rear face opposite to said front face, said first mirror comprising a slot configured to let pass a beam issued from the object, the imaging spectrophotometer comprising a beam shutter device disposed facing the front face of the first mirror and facing the slot of said first mirror, the shutter device comprising a vertical blade wider than the slot, said blade being movable in two positions, an open position according to which it prevents a direct ghost beam issued from the scanning mirror from passing through said slot, the beam issued from the object passing through said slot, and a closed position preventing any beam from passing through the slot.

The shutter device includes a black blade pivotally mounted facing the front face of the first mirror and two stops allowing to define the two positions.

The source of the illumination assembly is configured to emit a beam in the ultraviolet, visible or infrared range, and in one form is a laser, the illumination assembly further includes an assembly for shaping the beam emitted by the source in order to illuminate only a line on the object to be analyzed.

The illumination assembly includes a planar mirror for injecting the beam shaped towards the focusing mirror, the shaped beam being such that its image through said planar injection mirror is superimposed onto the slot of the first folding mirror.

The shaping assembly includes, in the direction of propagation of the light beam, a lens generating a line uniform in illuminance, a collimating cylindrical lens on the axis of the line, a lens to adapt the magnification.

The illumination assembly includes an integrating sphere placed facing the source, the sphere comprising a slot configured to let a light beam pass.

The illumination assembly further includes a spherical mirror pierced with a ring centered on the slot of the sphere and disposed facing the sphere, said spherical mirror being configured to let a beam pass and to reflect light and send it back to the sphere.

The spectrophotometer includes an imaging assembly and a detection assembly, the imaging assembly being arranged with respect to the first mirror to bring a beam coming from the slot to the detection assembly.

The detection assembly includes a CCD or CMOS sensor.

Further areas of applicability will become apparent from the description provided herein. It should be understood that the description and specific examples are intended for purposes of illustration only and are not intended to limit the scope of the present disclosure.

DRAWINGS

Other characteristics, aims and advantages of the present disclosure will emerge from the following description which is purely illustrative and not restrictive, and which should be read with reference to the appended drawings in which.

In all the figures, similar elements have identical references.

Figure 1:
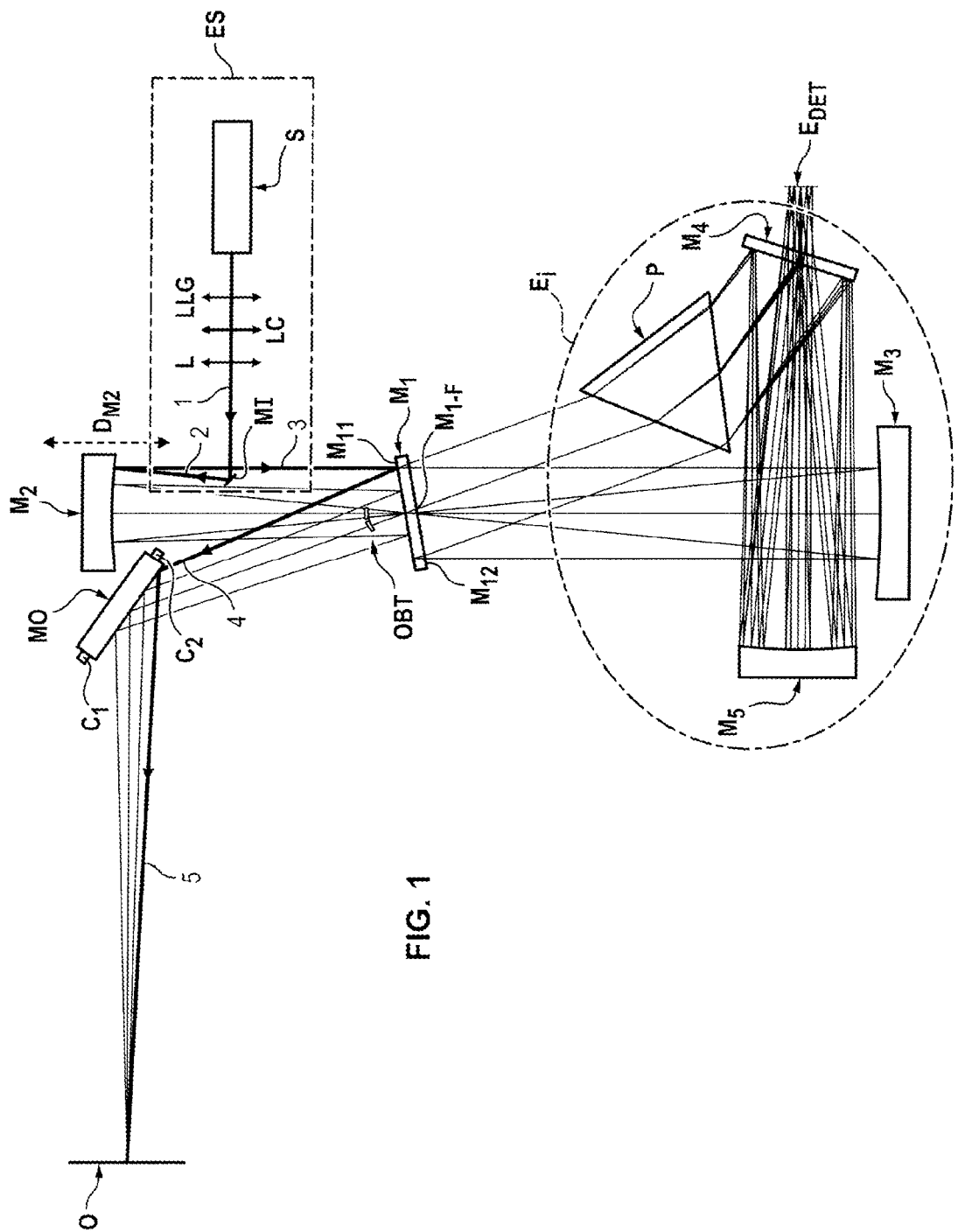
FIG. 1 illustrates an imaging spectrophotometer according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates an imaging spectrophotometer according to a first form of the present disclosure.

An object O to be analyzed is disposed in the object plane of the imaging spectrophotometer.

In order to light the object O, an illumination assembly ES comprises a source of emission S of an electromagnetic beam in a given wavelength or in a given wavelength range to the object to be analyzed.

The spectrophotometer by means of the illumination assembly ES allows scanning line by line the object O to be analyzed by means of the source of emission S.

According to this first form, the illumination assembly ES comprises a laser source and emits in the ultraviolet, visible or infrared range and allows characterizing an object O by its spectral response.

The object O excited by a wavelength belonging to the ultraviolet, visible or infrared range re-emits a beam in higher wavelengths ranging from ultraviolet to visible and infrared. It is this fluorescence that allows characterizing the object O to be analyzed.

The object O to be analyzed may be an adhesive, a resin, a paint, an organic or biological element or any other material or nanomaterial having fluorescent properties.

The illumination assembly ES comprises an assembly L, LC, LLG for shaping the beam emitted by the source in order to illuminate only one line on the object O to be analyzed.

This shaping assembly comprises particularly three lenses L, LC, LLG facing the source of emission S of the light beam:

LLG lens: laser line generator lens;
LC lens: collimating cylindrical lens on the axis of the laser line;
L lens or lens system: lens for imaging the laser line through the imaging spectrophotometer: the magnification is adjusted to the scanning area of the imaging spectrophotometer.

The illumination assembly ES comprises an injection mirror MI which allows injecting a beam 1 issued from the source S towards the imaging spectrophotometer.

A beam 2 issued from the reflection of the beam issued from the source on the injection mirror MI arrives on a focusing mirror $M_2$ which is in one form a spherical focusing mirror.

The beam 3 issued from the focusing mirror $M_2$ arrives on a first folding mirror $M_1$ and in particular on the front face $M_{11}$ of the latter. The first folding $M_1$ mirror further comprises an also reflecting rear face $M_{12}$ and a slot $M_{1-F}$ at its center. The slot $M_{1-F}$ allows letting the beam pass and has a width of a few tens of microns for a few millimeters long.

In one form, the shaping of the laser beam should be such that its image through the injection mirror MI is superimposed onto the slot $M_{1-F}$ of the first folding mirror $M_1$.

The first folding mirror $M_1$ reflects the beam 4 to a planar scanning mirror movable in rotation which reflects the beam 5 to the object O to be analyzed.

Advantageously, the illuminance of the object O is done laterally with a laser beam covering the analysis area: the laser forms a line on the area to be analyzed which corresponds to the field of the imaging spectrophotometer.

Such a configuration allows avoiding the specular reflection back into the spectrophotometer on the bright objects.

In addition, the lighting is done only on the useful area and therefore limits the photo-degradation and the heating by the source (for example UV in the case of the fluorescence) of the unanalyzed areas. Consequently, the exposure dose corresponds to the dose strictly necessary for the analysis.

In order to perform a focusing, on each side of the mirror M0, measuring sensors $C_1$, $C_2$ are disposed which allow measuring a distance between the object O and the scanning mirror MO. The focusing mirror $M_2$ is in turn movable in translation (along the axis $D_{M2}$ in FIG. 1) to adapt the imager to the distance measured by the measuring sensors $C_1$, $C_2$. This mobility allows adapting the focusing plane of the spectrophotometer to the position of the object or changing the focusing plane for a measuring in the volume of the object.

The beam issued from the object O to be analyzed arrives on the front face $M_{11}$ of the first folding mirror and reflects the beam to the focusing mirror $M_2$ which focuses the beam towards the slot $M_{1-F}$ of the first folding mirror M1. In this way, the beam passes through the thickness of the first folding mirror M1 via the slot $M_{1-F}$ which selects only one line of the object field.

The beam passing through the slot $M_{1-F}$ arrives on an imaging assembly $E_i$ which allows bringing this beam to a detection assembly $E_{DET}$ which consists only of a CCD or CMOS sensor.

In order to allow the acquisition of the beams, the imaging spectrophotometer comprises an OBT beam shutter device disposed facing the front face $M_{11}$ of the first mirror and at the level of the slot $M_{1-F}$ of this first mirror.

Figure 3:
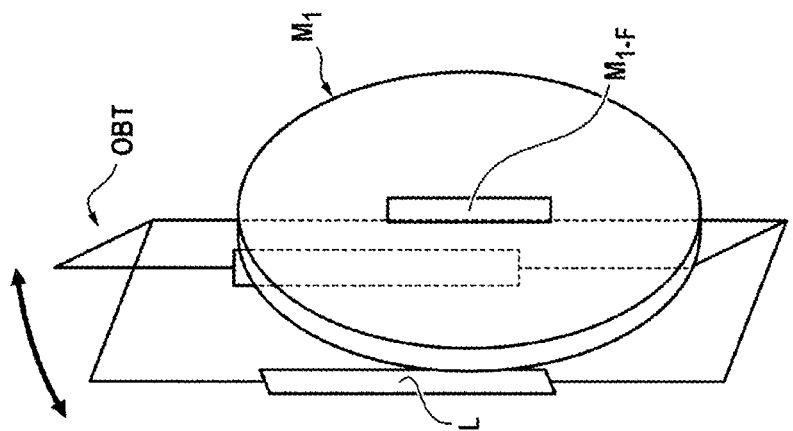
FIGS. 2 and 3 illustrate a shutter device of an imaging spectrophotometer according to the present disclosure.
Figure 2:
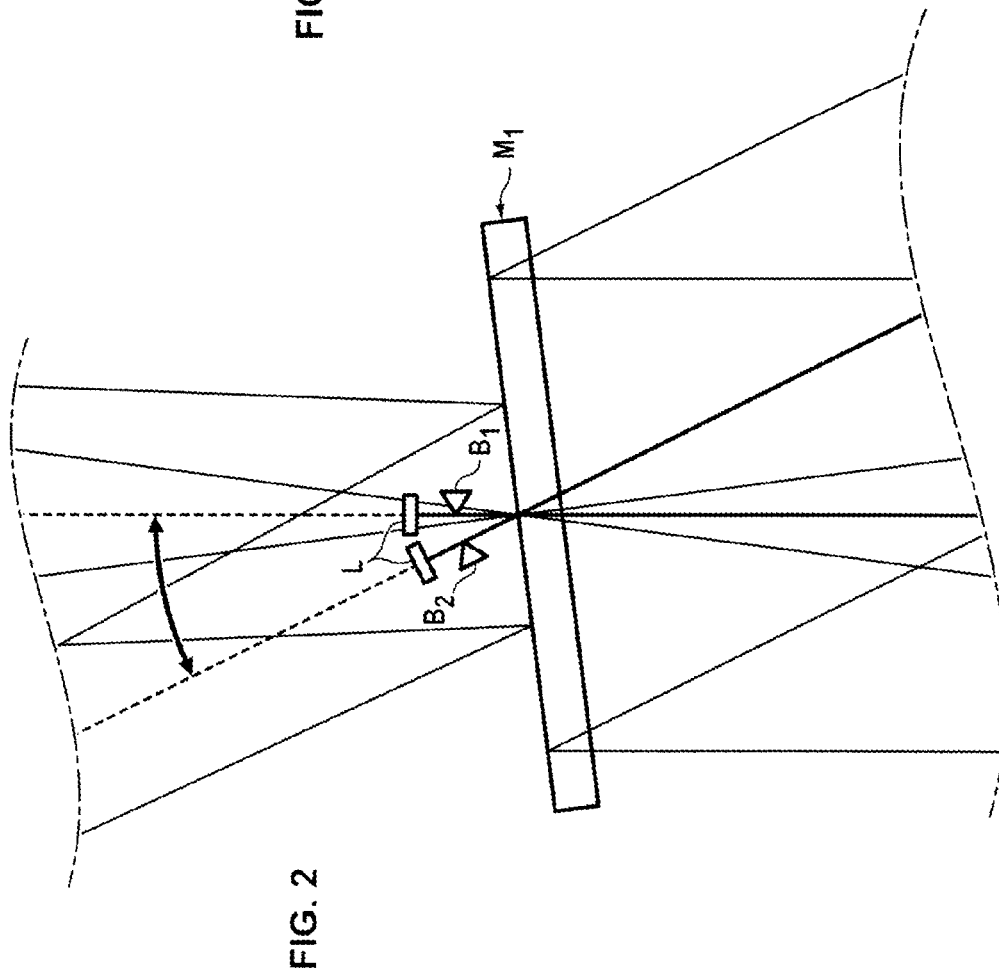

As illustrated in detail in FIGS. 2 and 3, the shutter device comprises a vertical blade L wider than the slot $M_{1-F}$ and two stops $B_1$, $B_2$ which define two positions between which the blade L is movable.

The stops $B_1$, $B_2$ limiting the two positions of the shutter device are adjustable either to mask the optical beam on the axis at $B_1$ or to occlude the direct light coming from the object O which is not reflected by $M_1$ and which passes through the slot.

Thus, the blade is movable in two positions, an open position in which it prevents a direct ghost beam issued from the scanning mirror M0 from passing through the slot, the (useful) beam issued from the object however passes through the slot via $M_2$, and a closed position preventing any beam from passing through the slot $M_{1-F}$. Thus, the CCD or CMOS sensor is not lighted during its reading, the data transfer and the strip selection.

Consequently, the shutter device has a dual function:

Shuttering the beam in place of a traditional mechanical shutter with a limited lifetime;

Removing the stray light that enters directly into the spectrophotometer via the strip selection mirror M0 and the slot $M_{1-F}$;

Such a shutter device has the advantage of being robust compared to the conventional iris shutters or equivalent system that works with blades that rub against each other. Indeed, the acquisition of a hyperspectral image often represents several hundred or several thousands of acquisitions (opening/closing of the shutter device) without counting the settings preceding the shots.

Thus, with a shutter device using only a black blade (since the field is imaged in the form of a line at the slot) fixed thanks to a blocked pivot connection (on ball bearings for example), there is no friction as in between the shutters of a conventional shutter for a circular pupil, and therefore no premature wear. A translation at a pivot connection is also possible.

The imaging assembly $E_i$ comprises a parabolic collimation mirror $M_3$ on which the beam issued from the slot $M_{1-F}$ arrives. The beams are then reflected by this collimation mirror $M_3$ and reflected by the rear face $M_{12}$ of the first folding mirror $M_1$.

The beam reflected by the rear face $M_{12}$ of the first folding mirror $M_1$ passes through a prism P which disperses the beam according to the wavelengths. The scattered beams arrive on a second folding mirror $M_4$ (which is pierced at its center, the piercing is circular or rectangular) which reflects the beams to an imaging mirror $M_5$. The imaging mirror $M_5$ reflects the beams to the detection assembly.

Figure 4:
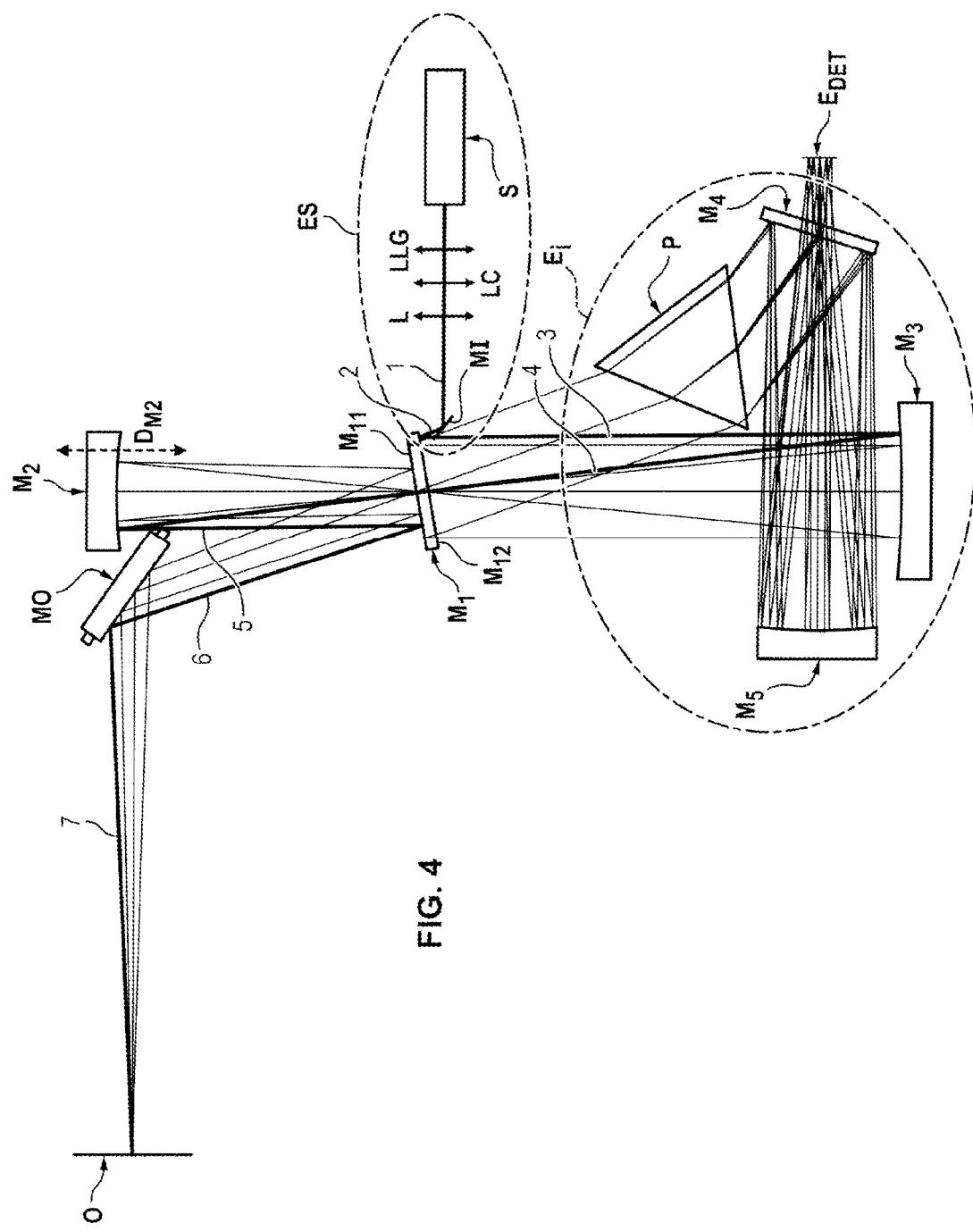
FIG. 4 illustrates an imaging spectrophotometer according to a second form of the present disclosure.

According to a second form, illustrated in FIG. 4, the illumination assembly ES may be further upstream in the imaging spectrophotometer.

According to this second form, the optical path to go from the illumination assembly ES is as follows:

A beam 1 issued from the source S arrives on the injection mirror MI which brings the beam 2 to the rear face $M_{12}$ of the first folding mirror $M_1$ which reflects the beam 3 to the collimation mirror $M_3$;

The collimation mirror $M_3$ reflects the beam 4 to the collimation mirror $M_2$;

The collimation mirror $M_2$ reflects the beam 5 to the front face $M_{11}$ of the first folding mirror $M_1$;

The folding mirror $M_1$ reflects the beam 6 to the scanning mirror M0;

The scanning mirror MO reflects the beam 7 to the object O to be analyzed.

The optical path from the object O to the detection assembly $E_{DET}$ is identical to that of the first form.

The different mirrors of this second form as well as the imaging assembly are identical to the first form. In addition, the imaging spectrophotometer according to this second form may comprise a shutter device.

Figure 5:
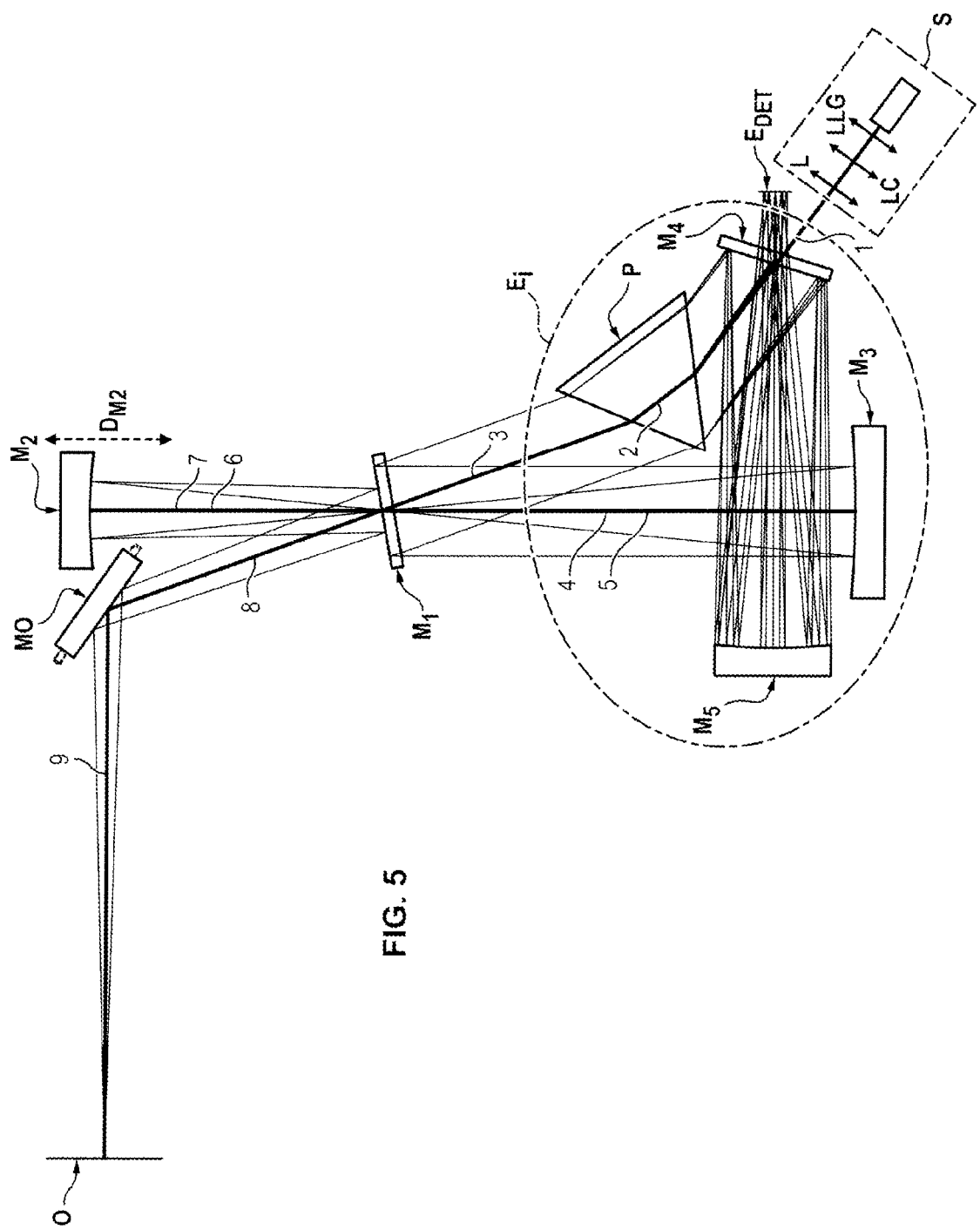
FIG. 5 illustrates an imaging spectrophotometer according to a third form of the present disclosure.

According to a third form, illustrated in FIG. 5, the optical axes of the source S and of the detection assembly $E_{DET}$ are aligned, which implies that there is no parallax for all the working distances. The illumination assembly ES may be at the level of the detection assembly.

According to this third form, it is noticed that the illumination assembly does not comprise an injection mirror:

a beam 1 issued from the source S passes through the pierced area of the mirror $M_4$ and arrives on the prism P and passes through the prism P 2;

the beam issued from the prism 3 arrives on the first folding mirror $M_1$ which reflects the beam 4 to the collimation mirror $M_3$ which in turn reflects the beam 5 to the first folding mirror $M_1$;

the beam issued from the first folding mirror 6 arrives on the collimation mirror $M_2$ which reflects the beam 7 to the first folding mirror $M_1$ which is in turn reflected by the first folding mirror $M_1$ to the scanning mirror MO 8;

the beam reflected by the scanning mirror MO arrives on the object O to be analyzed.

The different mirrors of this third form as well as the imaging assembly are identical to the first form. In addition, the imaging spectrophotometer according to this third form may comprise a shutter device.

Figure 6:
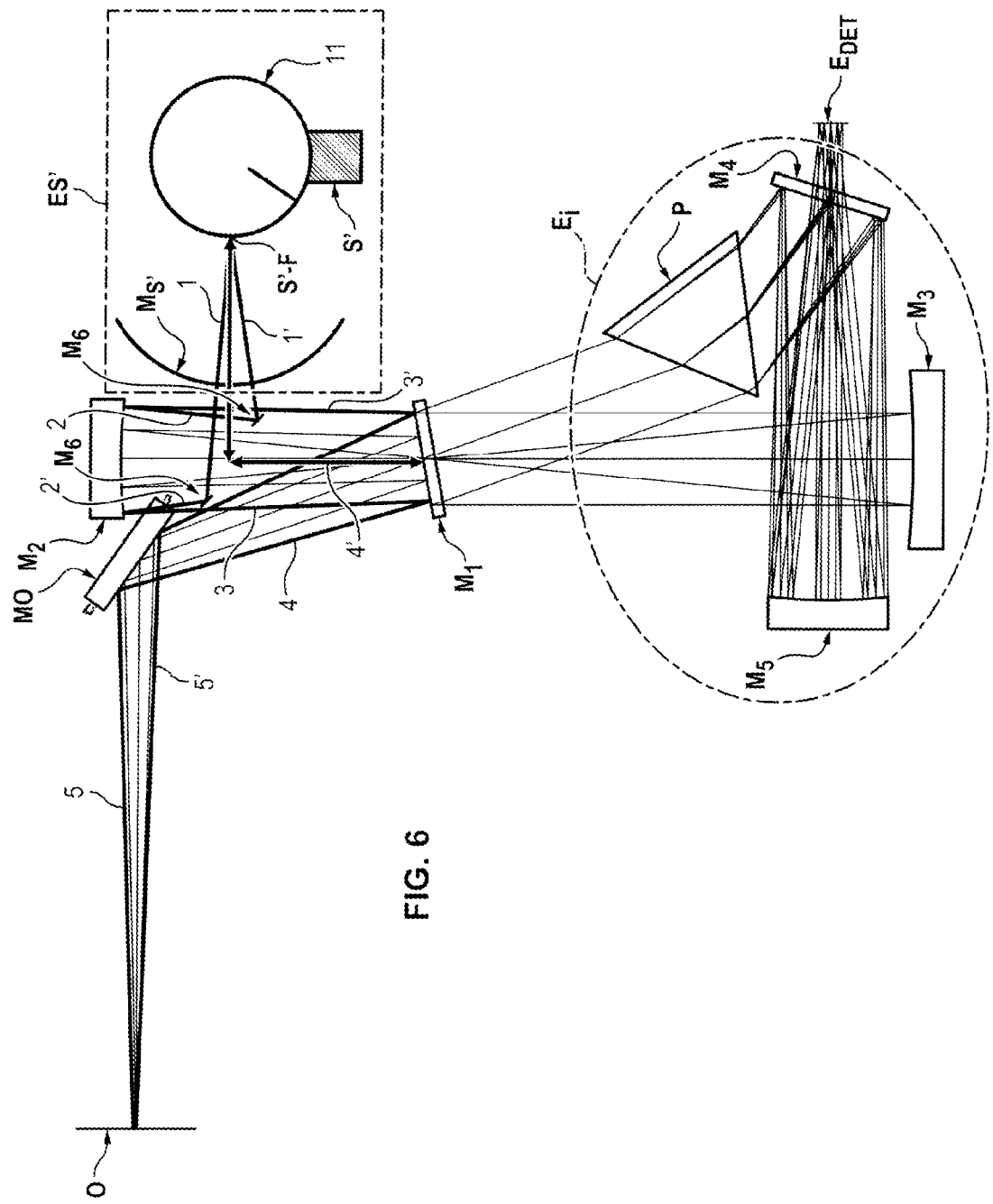
FIG. 6 illustrates an imaging spectrophotometer according to a fourth form of the present disclosure.

FIG. 6 illustrates a fourth form, according to which the light source S' of the illumination assembly ES' consists of a polychromatic source. A luminous flux is emitted in an integrating sphere 11 placed facing the light source S', which makes uniform the flux through the sphere 11 output port S'-F, which in this case is a slot with the same geometrical characteristics as the slot $M_{1-F}$.

Part of the flux issued from the slot S'-F of the sphere 11 is oriented towards the collector mirror $M_2$ of the spectrophotometer via a mirror $M_6$. The collector mirror $M_2$ lights the analysis area by refocusing the white light beam issued from the sphere as if it came from the slot. Here too, the illumination assembly ES' therefore generates an illuminance of the analysis area (in the form of a line).

In a complementary manner, a spherical mirror $M_S'$ (or an equivalent occulting surface) pierced with a ring centered on the slot S'-F of the sphere is disposed facing the sphere. In the case of a spherical mirror, the reflected light returns into the sphere.

Until the object O, the optical path is as follows:

The beam 1, 1' issued from the sphere is reflected by the mirror $M_6$ to the focusing mirror $M_2$ 2, 2';

The beam 2, 2' issued from the focusing mirror $M_2$ then arrives on the first folding mirror $M_1$;

The beam 3, 3' is then reflected to the first folding mirror $M_1$ which reflects the beam 4, 4' to the scanning mirror MO;

The scanning mirror MO reflects the beam 5, 5' to the object O to be analyzed.

This fourth mode is advantageous for the following reasons:

The lighting is integrated into the imaging spectrophotometer;

Only the useful area is lighted regardless of the working distance;

The scanning is synchronous with the source;

The illuminance calibration on the line is done in a single acquisition on a uniform plane and then allows radiometric uniformity corrections.

The different mirrors of this fourth form as well as the imaging assembly are identical to the first form. In addition, the spectrophotometer according to this fourth form may comprise a shutter device.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A broadband hyperspectral imaging spectrophotometer configured to analyze an object, said spectrophotometer comprising an illumination assembly comprising a source for emitting a light beam, said assembly being configured so that the light beam scans line by line the object to be analyzed;

a focusing mirror configured to receive the light beam from the illumination assembly;

a first folding mirror arranged to face the focusing mirror to receive the light beam reflected from the focusing mirror;

a planar scanning mirror movable in rotation and configured to receive the light beam reflected by the first folding mirror and reflect the light beam to the object along a line which is to be displaced; and two measuring sensors configured to measure a distance between the object and the planar scanning mirror, wherein the focusing mirror is movable in translation to adapt the imaging spectrophotometer to the measured distance by said measuring sensors, wherein the focusing mirror is moved along an axis that transverses an axis of light beam reflected by the planar scanning mirror onto the object.

2. The imaging spectrophotometer according to claim 1 further comprising a beam shutter device, wherein the first folding mirror comprises a front face oriented toward the focusing mirror and a rear face opposite to said front face, said first folding mirror comprises a slot configured to let pass a beam issued from the object, the beam shutter device is disposed facing the front face of the first folding mirror and facing the slot of said first folding mirror, the shutter device comprising a vertical blade wider than the slot, said blade being movable in two positions, an open position according to which it prevents a direct ghost beam issued from the scanning mirror from passing through said slot, the beam issued from the object passing through said slot, and a closed position preventing the beam issued from the object from passing through the slot.

3. The imaging spectrophotometer according to claim 2, wherein the shutter device comprises a black blade pivotally mounted facing the front face of the first mirror and two stops allowing to define the two positions.

4. The imaging spectrophotometer according to claim 2, wherein the source of the illumination assembly is configured to emit a beam in the ultraviolet, visible or infrared range, the illumination assembly further comprising an assembly for producing a shaped beam by shaping the beam emitted by the source in order to illuminate only one line on the object to be analyzed.

5. The spectrophotometer according to claim 4, wherein the illumination assembly comprises a planar injection mirror, which reflects the shaped beam towards the focusing mirror, the shaped beam being such that its image on said planar injection mirror is superimposed onto the slot of the first folding mirror.

6. The imaging spectrophotometer according to claim 5, wherein the shaping assembly comprises, in the propagation direction of the light beam, a lens generating a line uniform in illuminance, a collimating cylindrical lens on the axis of the line, and a lens for adapting the magnification.

7. The imaging spectrophotometer according to claim 2, comprising an imaging assembly and a detection assembly, the imaging assembly being arranged with respect to the first mirror to bring a beam coming from the slot to the detection assembly.

8. The imaging spectrophotometer according to claim 7, wherein the detection assembly comprises a CCD or CMOS sensor.

9. The imaging spectrophotometer according to claim 1, wherein the illumination assembly comprises an integrating sphere placed facing the source, the sphere comprising a slot configured to let a light beam pass.

10. The imaging spectrophotometer according to claim 9, wherein the illumination assembly further comprises a spherical mirror pierced with a ring centered on the slot of the sphere and disposed facing the sphere, said spherical mirror being configured to let a beam pass and to reflect light and return it to the sphere.

* * * * *